(No Model.)  7 Sheets—Sheet 1.

W. T. VALE.
BARREL MACHINE.

No. 580,608.  Patented Apr. 13, 1897.

Witnesses  
G. M. Neff  
H. R. Cameron

Inventor  
Wm. T. Vale  
by Ridout & Maybee,  
Attys (No Model.)  7 Sheets—Sheet 2.

W. T. VALE.
BARREL MACHINE.

No. 580,608.  Patented Apr. 13, 1897.

Witnesses
Fred Clarke
A. W. Neff

Inventor
Wm. T. Vale
by
Ridout & Maybee
Attys (No Model.)

W. T. VALE.
BARREL MACHINE.

No. 580,608.

7 Sheets—Sheet 3.

Patented Apr. 13, 1897.

Witnesses
A. M. Neff.
J. R. Cameron

Inventor
Wm T Vale.
by Ridout & Maybee,
Attys (No Model.) 7 Sheets—Sheet 4.
W. T. VALE.
BARREL MACHINE.
No. 580,608. Patented Apr. 13, 1897.
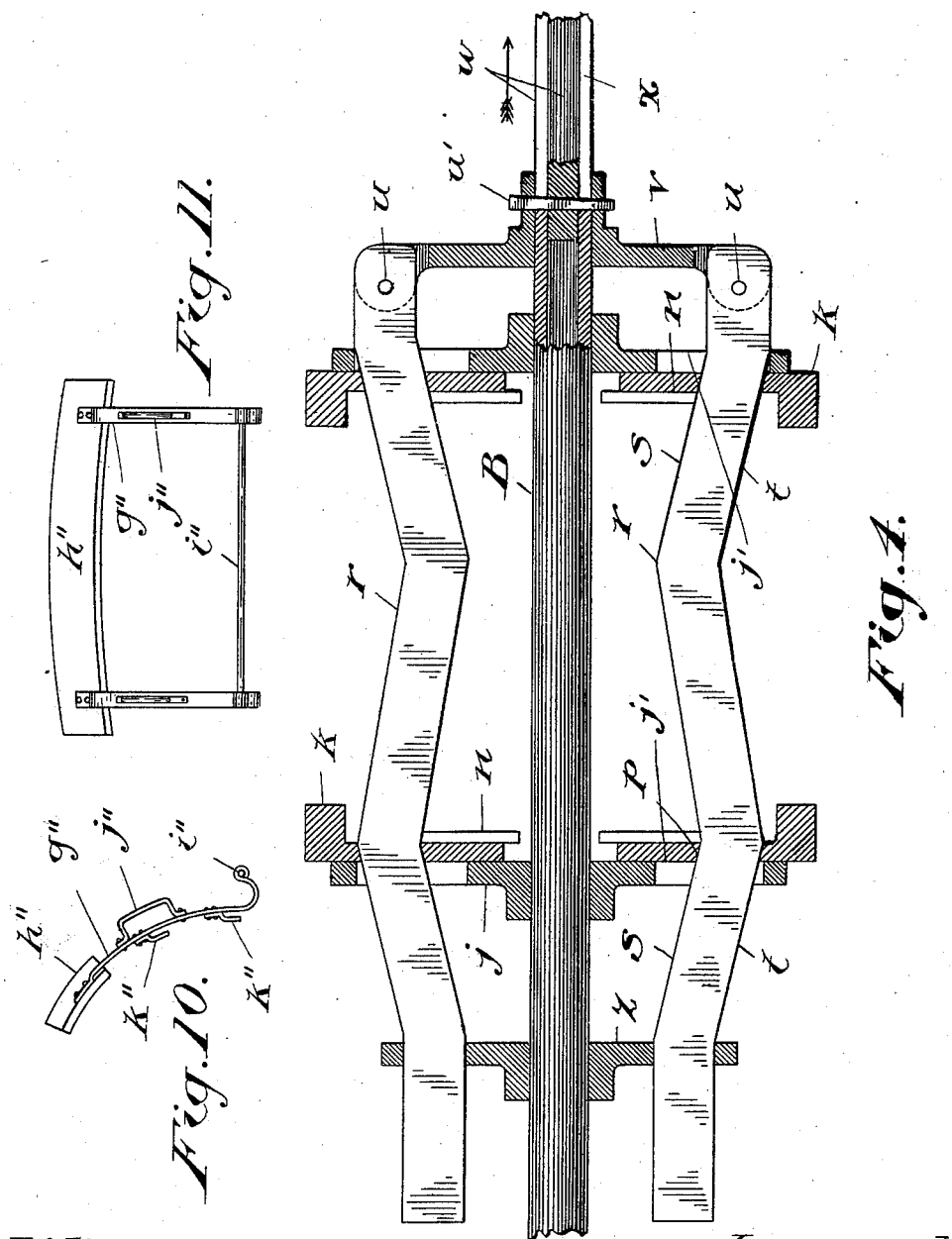
Witnesses
Fred Clarke
A. N. Neff
Inventor
Wm T. Vale
by
Ridout & Maybee
Attys (No Model.)  7 Sheets—Sheet 5.

W. T. VALE.
BARREL MACHINE.

No. 580,608. Patented Apr. 13, 1897.

Witnesses
A. W. Neff
G. W. Cameron

Inventor
Wm. T. Vale
by Ridout & Maybee
Attys

THE NORRIS PETERS CO., PHOTO-LITHO., WASHINGTON, D. C.

(No Model.)    W. T. VALE.    7 Sheets—Sheet 6.
BARREL MACHINE.
No. 580,608.    Patented Apr. 13, 1897.
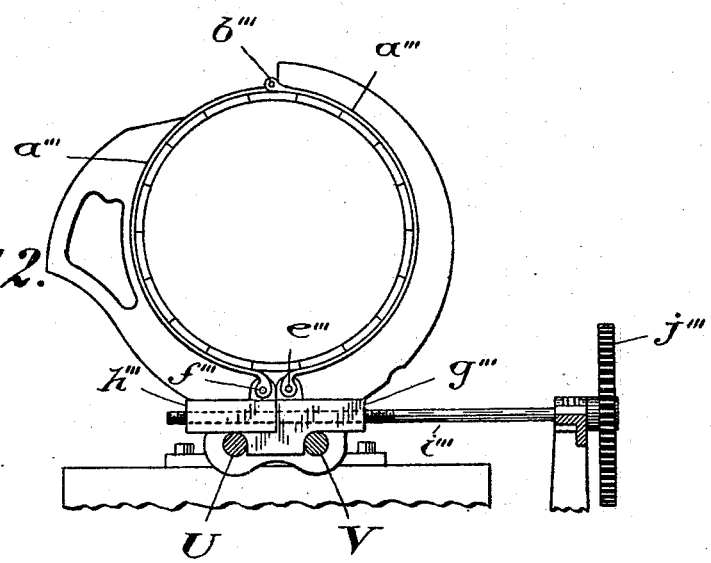
Witnesses    Inventor
Wm T. Vale
by Ridout & Maybee
Atty's (No Model.) 7 Sheets—Sheet 7.

W. T. VALE.
BARREL MACHINE.

No. 580,608. Patented Apr. 13, 1897.

Witnesses
A. M. Neff
Fred Clarke

Inventor
Wm. T. Vale,
by
Ridout & Maybee,
Atty's

UNITED STATES PATENT OFFICE.

WILLIAM T. VALE, OF TORONTO, CANADA, ASSIGNOR TO ALEXANDER BUNTIN AND ALEXANDER BUNTIN AS TRUSTEE, OF SAME PLACE.

BARREL-MACHINE.

SPECIFICATION forming part of Letters Patent No. 580,608, dated April 13, 1897.

Application filed May 4, 1896. Serial No. 590,197. (No model.)

*To all whom it may concern:*

Be it known that I, WILLIAM THOMAS VALE, manufacturer, of the city of Toronto, in the county of York and Province of Ontario, Canada, have invented a certain new and Improved Barrel-Machine, of which the following is a specification.

The object of my invention is to devise a machine for making tight barrels which will be both simple in construction and effective in operation; and it consists, essentially, of such improvements in the barrel-former, the sweeps retaining the exterior of the barrel in shape, the stave-feeding apparatus, and the stave hollowing, crozing, chamfering, and equalizing mechanism as are hereinafter more specifically described and then definitely claimed.

Figure 1:
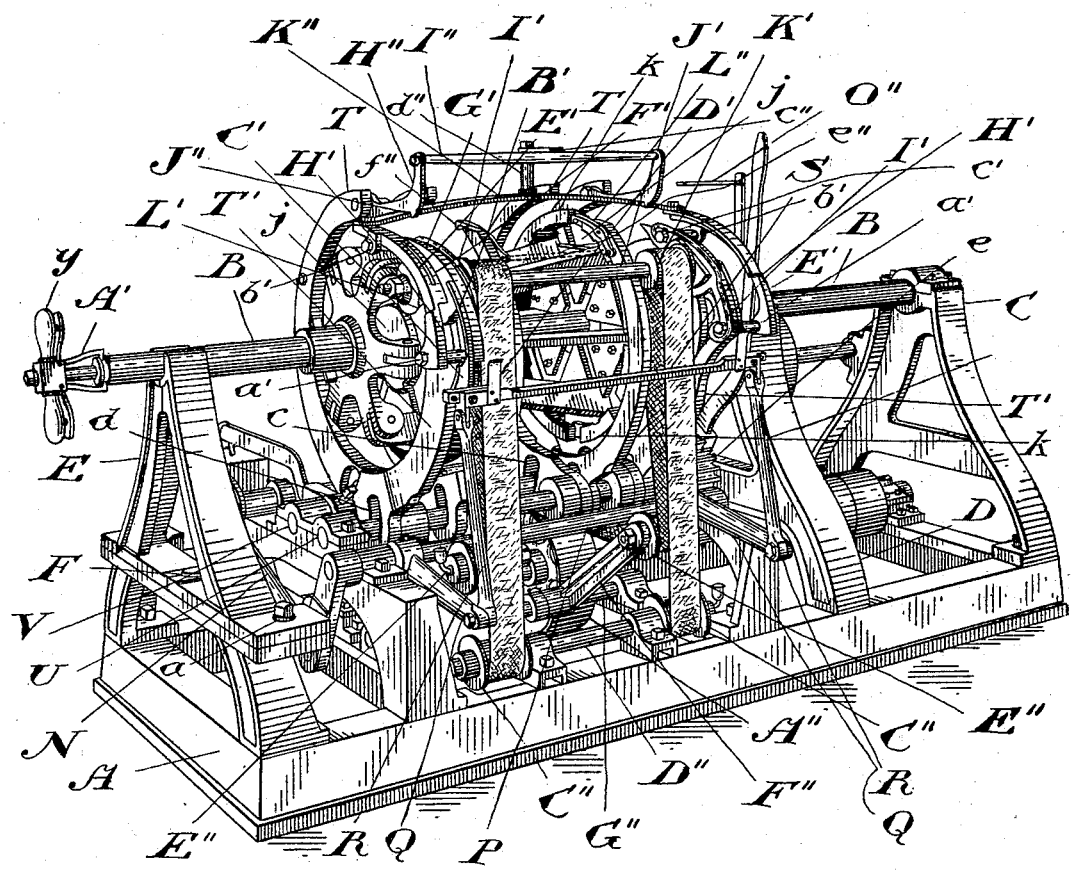
Figure 2:
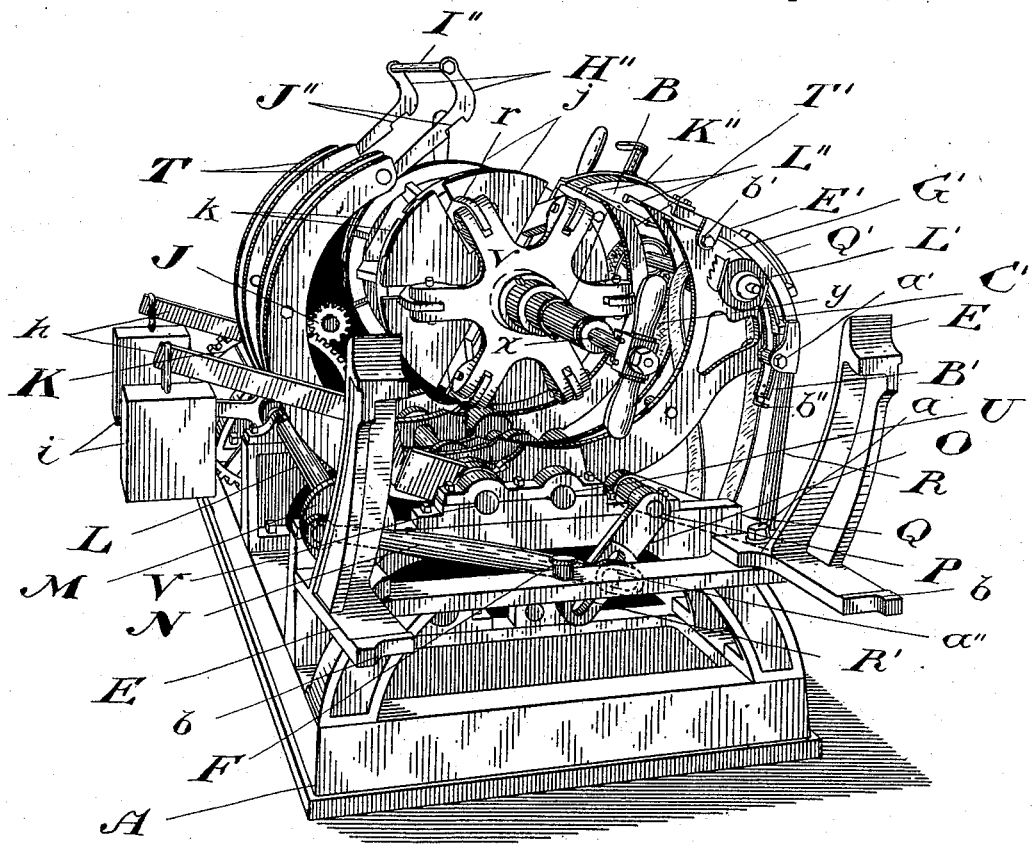
Figure 8:
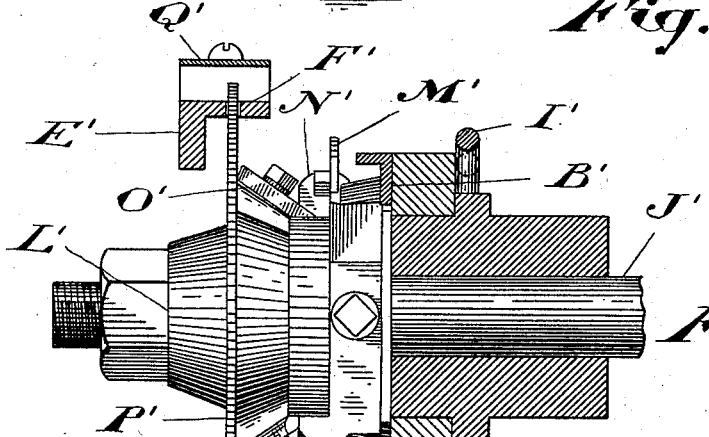
Figure 3:
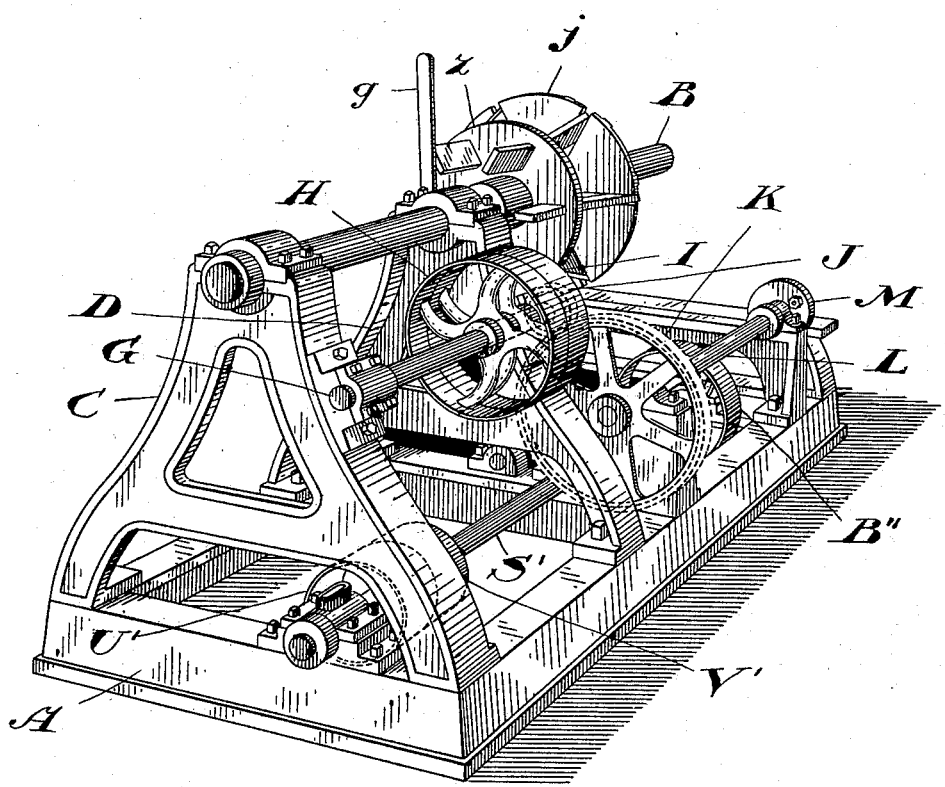
Figure 9:
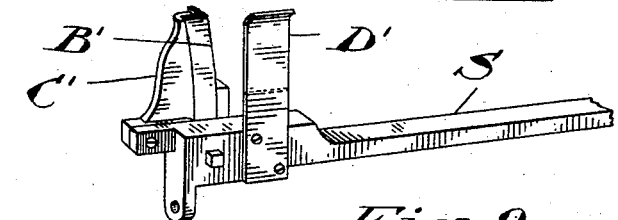
Figure 7:
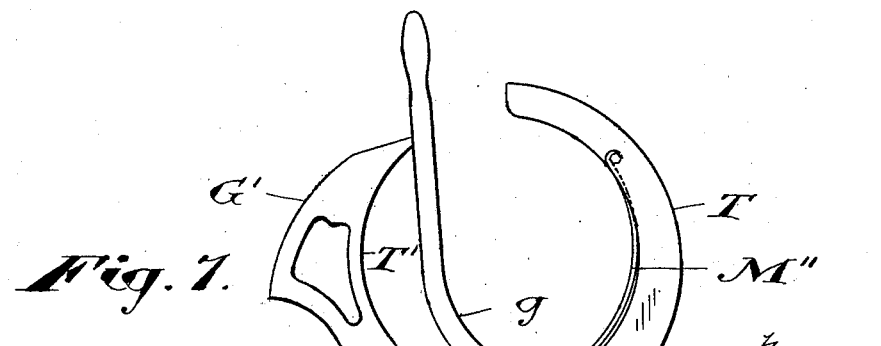
Figure 7A:
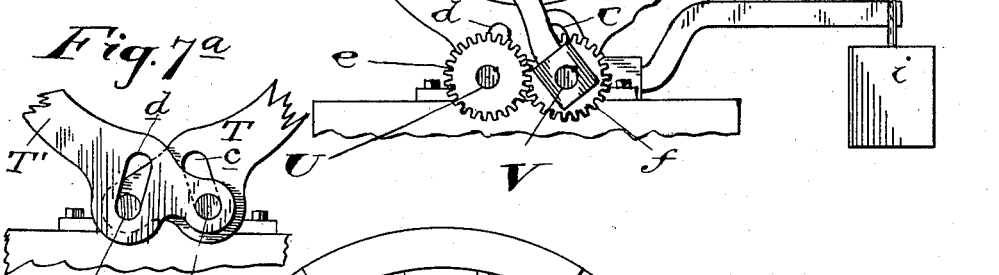
Figures 5, 6:
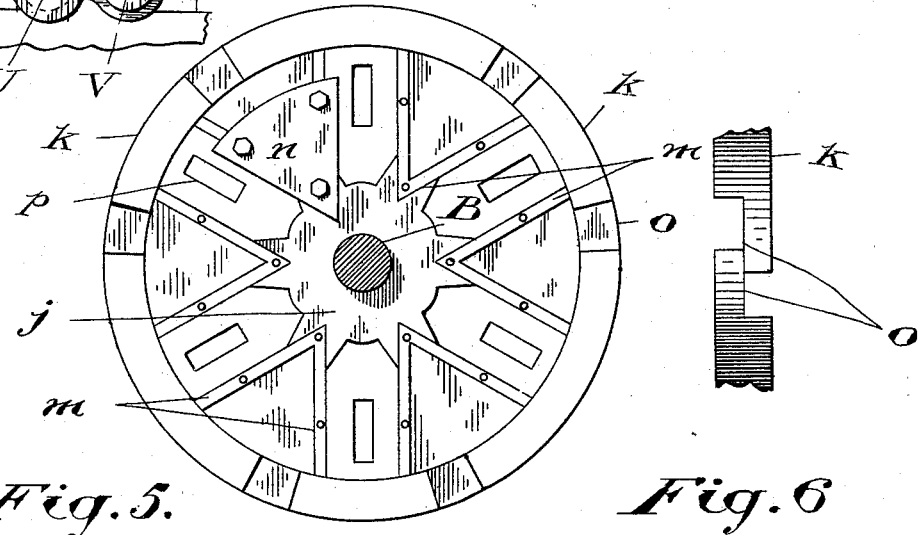
Figure 14:
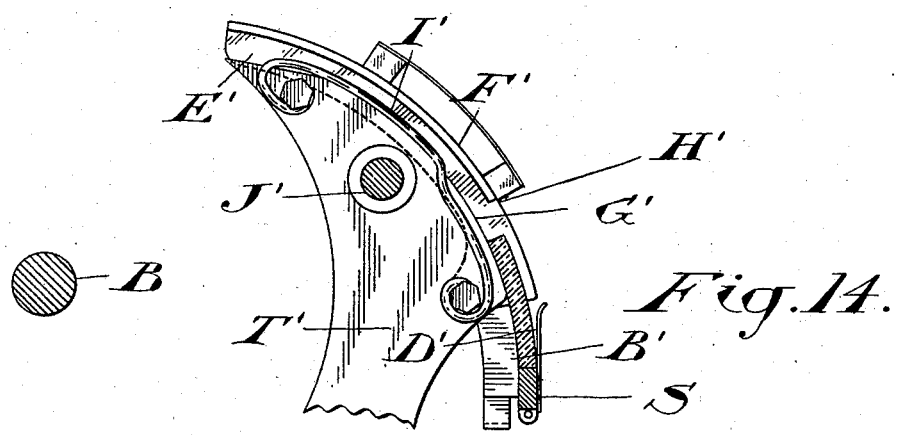
Figure 15:
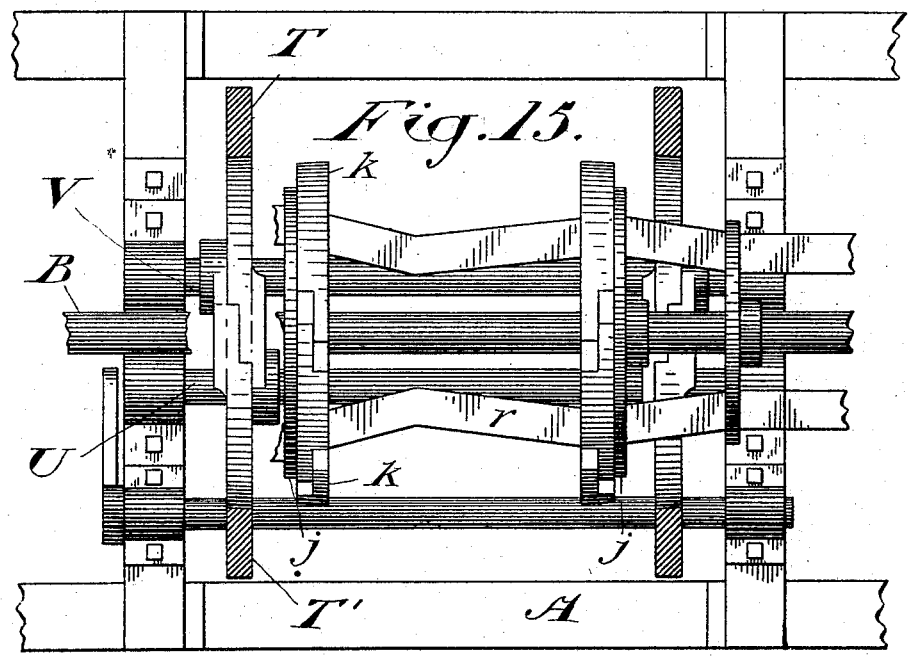

Figure 1 is a perspective front view of the machine. Fig. 2 is a perspective end view of the machine with the sweeps opened up and the former collapsed as it appears when a barrel has just been removed. Fig. 3 is a perspective detail showing the shafting and driving-pulleys. Fig. 4 is a longitudinal sectional elevation of the former. Fig. 5 is an elevation of one of the former-heads. Fig. 6 is a detail showing the method of overlapping the former-ring segments. Fig. 7 is a view in elevation, showing the mechanism for opening and closing the sweeps. Fig. 7$^a$ is a detail view somewhat similar to that shown in Fig. 7, but with the bearings and gear-wheels removed in order to better show how the sweeps are mounted. Fig. 8 is a sectional elevation of the cutter-heads and surrounding parts. Fig. 9 is a detail of the stave-carrier. Fig. 10 is a side elevation of a stave-feeder. Fig. 11 is a front elevation of the same. Fig. 12 is a sectional side elevation of the trussing mechanism. Fig. 13 is a skeleton front elevation of a portion of the machine, showing the trussing mechanism. Fig. 14 is a side elevation, partly in section, of the upper portion of one of the outer sweeps and the guideways thereon. Fig. 15 is a plan, partly in section, of the body of the machine, showing the relative positions of the former-heads and sweeps.

In the drawings like letters of reference indicate corresponding parts in the different figures.

A is the frame of the machine, suitably shaped, as shown, to support the different parts.

B is the former-shaft, supported in suitable bearings on the standards C, D, and E of the frame A.

The standard E is divided in two parts, as seen in Figs. 1 and 2, which halves are pivoted at $a$ to the frame of the machine.

F is a headed pin against which the inner portion of the base of each half of the standard E is fitted, the head of the pin holding the parts securely in contact with the base, on which they are adapted to turn.

It will be noticed that the halves of the base of the standard E are notched at $b$, so as to permit the halves to be swung outwardly, while the shoulders of the notches act as a stop to limit the inward motion. (See Figs. 1 and 2.)

Before describing the construction of the former itself it will be advisable to describe the general construction of the other parts of the machine.

In Figs. 1, 2, and 7, T T' are the sweeps or curved half-rings, which serve to give shape to the outside of the barrel. As will be seen in the drawings, there are four sets of these half-rings, so located as to form two substantially continuous rings near each end of the barrel. The rear sweeps T are rigidly connected to the shaft U, and the front sweeps are similarly connected to the shaft V.

It will be noticed that each half-ring T is slotted at $c$ to embrace the shaft V and that the half-rings T' are similarly slotted at $d$ to embrace the shaft U. These slots are so proportioned as to permit of the sweeps assuming either the position in Fig. 1 or the position shown in Fig. 2, motion being conveyed to them by the revolution of the shafts U and V. In Fig. 7 is seen more particularly the mechanism used for giving these shafts a simultaneous motion.

$e$ is a pinion fast on the end of the shaft U, and $f$ is a pinion fast on the shaft V. These pinions are of equal size and mesh with one another, as shown.

$g$ is a hand-lever connected to one of the pinions E and F. From this construction it will be seen that by moving the lever $g$ the sweeps may be made to assume either of the positions already described at the will of the operator.

In order to balance the weight of the sweeps, and thus facilitate the movement of the same, I connect to the shaft V two arms $h$. (See Figs. 1, 2, and 7.) On these arms are hung the weights $i$. As the tendency of the sweeps is to fall downward, and the tendency of the weights is to so revolve the shaft V as to maintain them in their vertical position or to return them thereto, the weight of the sweeps may be very accurately counterbalanced.

Within the sweeps T T' are the former-heads $j$, rigidly secured to the former-shaft B and each horizontally located in a position substantially midway between the two rings formed at each end by the half-rings T T', as indicated in Figs. 1 and 15. In Fig. 15 one of the two outer pairs of sweeps is shown, the use of the center sweeps being optional.

$k$ are ring-segments shaped substantially as shown and adapted to slide between the guides $m$. (See Figs. 4, 5, and 6.)

$n$ are plates screwed, as shown, to the guides $m$ and overlapping the stems of the ring-segments $k$, so as to hold them in place. The ends of each segment are notched, as shown at $o$, so as to permit the ends to overlap when the rings are either in their extended or collapsed positions. From this construction it follows that the ring-segments may be made to occupy the position shown in Figs. 1 and 5, so as to form a complete ring, or may be collapsed below the edges of the former-heads $j$, so as to permit of a barrel being removed from the former.

Each ring-segment is slotted at $p$ to permit of the bars $r$ sliding therein, the former-heads $j$ having long slots $j'$ formed therein for the passage of the bars. These bars are shaped as shown and are provided with inclined planes $s$ and $t$, adapted to force the ring-segments $k$ inwardly and outwardly when the bars are reciprocated. These bars $r$ slide through a head $z$, fast on the former-shaft B, their other ends being connected at $u$ to the sliding head $v$. This head has a pin $u'$ passing through its hub and through slots $w$ in the hollow end of the former-shaft B. This pin also passes through a rod $x$, the other end of which is provided with the handle $y$, by means of which it may be moved longitudinally. Spring-operated catches A' are also provided for holding it in position when the sections of the former are extended, substantially as in my prior United States patent, No. 531,283, of December 18, 1894. From this construction it follows that when the rod $x$ is moved in the direction indicated by arrow in Fig. 4 the ring-segments $k$ are forced inwardly (see Fig. 2) and that when it is returned again to its original position the segments are forced outwardly to assume the position shown in Figs. 1, 4, and 5.

The outer sweeps T' at the front of the machine have the stave-carrier guides B' formed on or connected thereto. These guides, as shown in Figs. 8 and 9, are suitably shaped to fit the heads C', which slide thereon. To these heads are bolted the ends of the stave-carrier S, which has fingers D' connected thereto to retain the stave in position. Mechanism is provided for reciprocating the stave-carrier on the guides B', as hereinafter described.

It should be noted here that the upper part G' of each of the outer sweeps T' is suitably shaped to guide the stave in below the inner edges of the sweeps T, the outer surface of the guides B' being substantially flush with the part G'. E' are the stave-guides. (See Figs. 1, 2, and 8.) One of these guides is connected at $a'$ $b'$ to each end sweep T', so as to stand out at some distance laterally therefrom. Each guide is provided with a flange F', beneath which the end of the stave passes, so that it is held down tightly against the surface of the upper portion G' of the outer sweeps T'.

It will be noticed that at H' a portion of the flange F' is cut away, so that the stave N may be pressed down so as to be in a position to pass underneath the flange. Connected to the inner surface of the upper portion G' of each of the outer sweeps T' is a curved spring I', bolted at $c'$ to the sweep, as shown. As each of these springs projects slightly above the surface of the upper part G' of the sweep it will press the stave with a spring-pressure against the lower surface of the stave-guide E', thus holding the stave very firmly while it is being operated upon by the cutter-heads, as hereinafter described.

It will be noticed that the springs are shaped as an inclined plane, up which the staves are driven till they reach the portion of the spring normally highest above the surface of the upper portion of the sweep. In Fig. 8 is indicated the normal position of the spring in full lines and in dotted lines the position it assumes when pressed down by the passage of the stave.

Journaled in the portions G' of the outer sweeps T' is the cutter-shaft J'. This shaft is provided with the driving-pulleys K' and also with the cutter-heads L', which are located, as shown in Fig. 1, beneath the stave-guides E'. Each cutter-head carries crozing-saws M', hollowing-tools N', chamfering-knives O', and an equalizing-saw P', which latter projects through a slot in the stave-guide E', as shown in Fig. 8. This slot is preferably covered by a saw-guard Q'. In Fig. 1 the guards are removed, exposing the slots in the saw-guides, and in both Figs. 1 and 2 the equalizing-saws are omitted to show the parts behind.

On reference to Figs. 3 and 2 the arrangement of the mechanism for imparting motion to the cutter-heads and the stave-carrier will be readily understood.

In Fig. 3, G is a shaft journaled on standards C and D. This shaft carries the tight and loose pulleys H and I and also at one end the pinion J, meshing with the spur-wheel K on the end of the shaft L, which is suitably journaled on the frame A of the machine. The other end of this shaft carries a crank-disk M and a wrist-pin, on which is journaled the pitman N, (see Figs. 1 and 2,) the other end of which is pivoted to the lever O, fast on the shaft P, suitably journaled on the frame of the machine. Two levers Q are also connected to this shaft and are pivoted at their outer ends to the connecting-rods R, which are pivoted at their other ends to lugs formed on the stave-carrier S. (See Fig. 1.) From this construction it follows that a reciprocating motion will be given to the stave-carrier through the rotation of the shaft G. As it is desirable to be able to regulate the extent of this motion, the lever O is preferably slotted at R' and the end of the pitman N, connected with the pin $a''$, adjustably held therein. It will be readily seen from this construction that the exact amount of throw of the stave-carrier S will depend upon the point of pivotal connection of the pitman N to the lever O.

It will be noticed that the end of the pitman N is slotted to slide on the pin $a''$, so that the carrier and the parts connected thereto will be left at rest for a short time after feeding a stave to the machine and returning to its first position. While the carrier is left at rest, its heads C' rest on the stops $b''$ on the guides B'. (See Fig. 2.)

Again referring to Fig. 3, S' is a shaft suitably journaled on the frame of the machine. On this shaft are the tight and loose pulleys U' V'. On the other end of the shaft are rigidly connected the pulleys A'' (see Fig. 1) B''. (See Fig. 3.)

In Fig. 1 are shown the idler-pulleys C'', connected to the shaft D'', journaled on the frame of the machine. E'' are idler-pulleys, each journaled at the end of an arm F''', connected to the shaft G''', journaled on the frame of the machine. A belt passes round the far pulley K' on the cutter-shaft, thence round one of the idler-pulleys C'', thence round the pulley A'', round the idler-pulley E'', and back to the far pulley K'. The near pulley K' is similarly driven from the pulley B''. The weight of the idler-pulleys E'' and the arms to which they are connected is sufficient to keep the driving-belts tight on the cutter-shaft pulleys, but weights may be suspended from the arms, if necessary.

In Figs. 1 and 2 will be seen the locks H'', one of which is pivoted to each of the outer sweeps T. These pivoted locks are connected together by a bar I'' and are notched at J'' to engage with the curved bar K'', connected to the ends of the stave-guides E'. These locks when engaged with the bar K'' serve to retain the sweeps T T' in closed position while the barrel is being formed. A finger $c''$ is pivoted on the post $d''$, connected to the bar K''. By swinging this finger above the bar I'' the locks H'' are held securely in contact with the said bar, while by pushing back the finger the bar I'' may be freed so that it may be lifted.

It will be noticed on reference to Figs. 1 and 2 that the central sweeps T are provided with pivoted locks L'', which serve to guide the staves below the inner edges of the sweeps T. At the same time, when the first stave is forced onto the former, the points $f''$ of the pivoted locks will prevent it sliding forward and falling down the front side of the former. When the last stave is to be placed in the machine, the first stave having passed completely round the former will come into contact with the other side of the points $f''$ of the pivoted locks L'' and will be securely held while the other staves are forced against it and the last stave placed in position. $e''$ is a bar connecting the outer ends of the locks.

To prevent binding and unnecessary friction and waste of power, I connect to each outer sweep T a curved spring M'', which is held at each end similarly to the curved springs I', and which starts from a point below the inner edge of the sweep and gradually rises above it. (See Fig. 7.) This spring always maintains a pressure upon the staves, and at the same time will yield to prevent binding of the machine if the staves may happen to be somewhat thicker than usual or present other inequalities of surface. I do not consider it necessary in this machine that the former itself should revolve, but provision may be made for doing so, if required.

In Fig. 1 is seen the support O'' for the end hoops which are to be placed on the barrels.

Having set out the construction of my machine, I will briefly describe its operation.

When ready for operation, the parts are all in the position shown in Fig. 1, and the loose pulleys on the shafts G and S' are connected by belts with the line-shafting. By shifting these belts onto the tight pulleys the machine is set in operation and the cutters commence to revolve and the stave-carrier to reciprocate on its guides. A stave is then placed on the carrier behind the fingers D' and is carried forward under the flanges F'', which, as before stated, are cut away at H' to permit of the ends of the staves passing beneath them. The carrier then returns to its first position and another stave is inserted, which is carried forward like the first and pushes it, the first stave, over the cutter-heads L', where it is properly hollowed, crozed, chamfered, and equalized, the curved springs I' holding the staves rigidly while this is being done. Another stave is then inserted and carried forward as before, pushing forward the second stave into position to be operated upon by the cutter-heads. By the time the fourth stave has been inserted the first stave has been pushed forward over the pivoted locks and under the upper portions of the sweeps T', resting against the points $f''$ of the locks. This process is continued till sufficient staves have been put into the machine to complete the barrel. The stave-carrier S pushes up this last stave and returns to its normal position. It follows that three of the staves required to form a barrel are left on the feeding apparatus, thus leaving a vacancy for three staves in the former. These last three staves may be fed into the barrel by putting fresh staves on the carrier, so as to push the last three into their place in the barrel; but by this method the bar $e''$ of the pivoted locks L'' will be covered by the staves, so that it is difficult to get at it to operate them. I therefore provide the apparatus shown in Figs. 10 and 11. This consists of a frame composed of the curved bars $g''$, stave $h''$, and cross-bar $i''$. Handles $j''$ are preferably connected to the curved bars $g''$. Lugs $k''$ are connected to each of the curved bars $g''$ in the position shown. It will be noticed that the curved bars $g''$ stand out from the stave $h''$. The object of this is to permit the fingers D' on the stave-carrier S to fit underneath them. When used with this frame, the fingers D' are preferably cut off short, as indicated in dotted lines in Fig. 9. This frame is used by placing the stave $h''$ on the stave-carrier. This enables the stave-carrier to push one more stave onto the former. When the stave-carrier retreats, the first set of lugs $k''$ are caught on the fingers D' and another stave is forced onto the former. When the stave-carrier again retreats, the last set of lugs $k''$ are caught on the fingers D' and the last stave thus forced onto the former. The machine is then stopped by shifting the belts, the bar $e''$ depressed to raise the points $f''$ of the locks L'', and a hoop removed from the support O'' and put on the end of the barrel. Another hoop, which has previously been hung over the former-shaft B, is placed on the near end of the barrel, which is then ready for removal. The bar I'' is then lifted upward and the locks H'' thus raised from the curved bar K''. By operating the hand-lever $g$ the sweeps are then swung into the position shown in Fig. 2. The handle $y$ is then grasped, the spring-operated catches A' released, and by pulling on the handle the ring-segments of the former collapsed, as already described. The halves of the standard E are now swung open and the barrel removed from the former, ready to receive the heads and the other hoops.

In Figs. 12 and 13 is shown the mechanism for trussing the barrels before they are removed from the former.

$a'''$ are half-rings pivotally connected together at $b'''$, and also pivoted at $e'''$ and $f'''$ to the blocks $g'''$ and $h'''$. The block $g'''$ is supported on the shafts U and V, and the block $h'''$ slides upon the block $g'''$, as shown.

$i'''$ is a spindle having right and left hand threads formed thereon. The spindle passes through similarly-threaded holes in the blocks $g'''$ and $h'''$, so that by revolving the spindle the blocks may be drawn closer together or moved farther apart. Suitable gear-wheels $j'''$ are placed on each of these spindles and are driven simultaneously by the pinion $k'''$, which may be revolved by hand or in any other suitable manner.

When the barrel is formed, the former is partially collapsed and the spindles $i'''$ operated to close the half-rings $a'''$ upon the barrel, and thus tightly truss the staves together. This operation is performed before the end hoops are placed in position, as already described. When it is desired to move the barrel from the former, the half-rings $a'''$ are loosened and their upper pivots $b'''$ are withdrawn. The half-rings then drop entirely out of the way and the barrel is removed, as already described.

It should be mentioned that the staves are preferably bent in suitable rolls before being placed in the machine.

The parts of the invention which I deem of particular importance are, first, the construction of the former, which is very simple and yet exceedingly strong and perfectly rigid when in its extended position; second, the method of supporting the outer end of the former-shaft by the divided standard E, which gives a perfectly rigid bearing for the shaft and yet may be instantly opened up to permit of the removal of a barrel; third, the construction of the sweeps, which are pivoted and counterbalanced, so as to be much more easily and simply operated than in former machines, where they have been arranged to slide; fourth, in the use of a sliding feed connected to the front sweeps of the machine instead of a roller-feed connected to a separate swinging frame, such as has been previously used; fifth, in the similar location of the cutter-shaft and cutter-heads.

Other details of construction which I consider new are more particularly set out in the claims forming a part of this specification.

In addition to possessing many advantages already set out I find that this machine requires but four-horse power for its operation, which is greatly less than that used by any other machine doing the same amount of work.

What I claim as my invention is—

1. The combination in a barrel-machine and with the former thereof, of two shafts U and V suitably journaled on the frame of the machine, two or more sets of sweeps or half-rings T T', the front sweep being mounted on the rear shaft and the rear sweep being mounted on the front shaft, the said sweeps and shaft being shaped to avoid each other when the sweeps are dropped to release the barrel, pinions secured to said shafts U and V thereby gearing them together, and means for operating said shaft, substantially as and for the purpose specified.

2. In a barrel-machine and in combination with the former thereof, of two shafts U and V, pinions $e$ and $f$ secured to said shafts and thereby gearing the latter together, front and rear sweeps, the front sweep being connected to the rear shaft and the rear sweep to the front shaft, said sweeps being slotted at c and d to allow of the sweeps moving without interference with said shafts U and V, means as the handle G for opening and closing said shafts, and a weighted arm k connected with one of said shafts and arranged to normally hold the sweeps in a closed position, substantially as described.

3. In a barrel-machine, mechanism for feeding staves into the barrel-forming portion of the machine comprising the following elements: the upper portions G' of the outer sweeps T'; the guides B' formed on or connected thereto; the stave-carrier S adapted to slide thereon; means for reciprocating the stave-carrier on the said guides; the stave-guides E' having flanges F' formed thereon and cut away at H', substantially as and for the purpose specified.

4. In a barrel-machine, mechanism for feeding staves into the barrel-forming portion of the machine comprising the following elements: the upper portions G' of the outer sweeps T'; the guides B' formed on or connected thereto; the stave-carrier S adapted to slide thereon; fingers D' formed on or connected to the stave-carrier; means for reciprocating the stave-carrier on the said guides; and the stave-guides E' having flanges F' formed thereon and cut away at H', substantially as and for the purpose specified.

5. In a barrel-machine, mechanism for preparing the end or ends of the stave comprising the following elements: the upper portions G' of the outer sweeps T'; the cutter-shaft J' journaled in one or both; means for rotating the same; one or more cutter-heads L' on the said shaft; stave-guides E'; the flanges F' thereon; and means for feeding the staves past the cutter head or heads, substantially as and for the purpose specified.

6. In a barrel-machine mechanism for preparing the ends of the staves comprising the following elements: the upper portions G' of the outer sweeps T'; the cutter-shaft J' journaled therein; means for rotating the same; the cutter-heads L' secured on the said shaft and carrying hollowing, crozing and chamfering tools and the equalizing-saws P'; the stave-guides E'; the flanges F' formed thereon and having slots R' formed therein through which the equalizing-saws P' pass; and means for feeding the staves past the cutter-heads, substantially as and for the purpose specified.

7. In a barrel-machine, mechanism for preparing the ends of the staves comprising the following elements: the upper portions G' of the outer sweeps T'; the cutter-shaft J' journaled therein; means for rotating the same; the cutter-heads L' on the said shaft; the stave-guides E'; the flanges F' thereon; the springs I' secured to the upper portions G' of the outer sweeps T' and adapted to press the stave ends against the stave-guides E'; and means for feeding the staves past the cutter-heads, substantially as and for the purpose specified.

8. In a barrel-machine, mechanism for preparing the ends of the staves comprising the following elements: the upper portions G' of the outer sweeps T'; the cutter-shaft J' journaled therein; means for rotating the same; the cutter-heads L' on the said shaft; the stave-guides E'; the flanges F' thereon; the springs I' secured to the upper portions G' of the outer sweeps T' and adapted to press the stave ends against the stave-guides E'; guides B' on the said portions G', heads C' sliding thereon; the stave-carrier S connected thereto and means for reciprocating the stave-carrier, substantially as and for the purpose specified.

9. In a barrel-machine, mechanism for preparing the ends of the staves comprising the following elements: the upper portions G' of the outer sweeps T'; the cutter-shaft J' journaled therein; means for rotating the same; the cutter-heads L' on the said shaft; the stave-guides E'; the flanges F' thereon; the springs I' secured to the upper portions G' of the outer sweeps T' and adapted to press the stave ends against the stave-guides E'; guides B' on the said portions G ; heads C' sliding thereon; the stave-carrier S connected thereto; the fingers D' on the stave-carrier, and means for reciprocating the stave-carrier, substantially as and for the purpose specified.

10. In a barrel-machine, a former carried by a former-shaft, in combination with a stationary standard or standards forming a bearing for one end of the shaft and a divided standard forming a bearing for the other end of the shaft, the halves of the standard being pivoted so that they may be swung aside to leave the way clear for the removal of a barrel from the former, substantially as and for the purpose specified.

11. In a barrel-machine, the combination of a former and a former-shaft B journaled in the standards C and D and the divided standard E, the halves of which are pivoted at a and notched at b to fit against a pin F, substantially as and for the purpose specified.

12. In a barrel-machine, the combination of a former and a former-shaft B journaled in the standards C and D and the standard E, the halves of which are pivoted at a and notched at b, a headed pin F arranged to coact with the notched halves of said standard, substantially as and for the purpose specified.

13. In a barrel-machine, a stave-feeder comprising the following elements: the curved bars g"; stave h"; cross-bar i" and one or more sets of lugs k" connected to the curved bars g", substantially as and for the purpose specified.

14. In a barrel-machine, trussing mechanism comprising two blocks, right and left hand threaded spindles passing through similarly-threaded holes in said blocks, means for rotating said spindles to move said blocks to and from each other, a ring having its ends pivotally connected to said blocks, and means as the pin $b^3$ for allowing a rapid detachment of the ring, substantially as described.

15. In a barrel-machine, trussing mechanism comprising the following elements: the half-rings $a'''$ pivoted together at $b'''$; the blocks $g'''$ and $h'''$ to which the half-rings $a'''$ are pivoted at $e'''$ and $f''''$, one of the blocks being adapted to slide upon the other; the shafts U and V supporting the block $g'''$; right and left hand screw-threaded spindles $i'''$ fitting correspondingly-threaded holes in the blocks $g'''$ and $h'''$, and means for operating the spindles, substantially as and for the purpose specified.

Toronto, February 11, 1896.

WILLIAM T. VALE.

In presence of—
 A. M. NEFF,
 J. EDW. MAYBEE.